(12) United States Patent
Vedani et al.

(10) Patent No.: US 10,651,737 B2
(45) Date of Patent: May 12, 2020

(54) ELECTRONIC CONVERTER

(71) Applicant: LEDCOM INTERNATIONAL S.R.L., Milan (IT)

(72) Inventors: Silvio Vedani, Calolziocorte (IT); Mauro Tosi, Varallo Pombia (IT)

(73) Assignee: LEDCOM INTERNATIONAL S.R.L., Milan (IT)

( * ) Notice: Subject to any disclaimer, the term of this patent is extended or adjusted under 35 U.S.C. 154(b) by 0 days.

(21) Appl. No.: 16/331,000

(22) PCT Filed: Jul. 26, 2017

(86) PCT No.: PCT/IB2017/054527
§ 371 (c)(1),
(2) Date: Mar. 6, 2019

(87) PCT Pub. No.: WO2018/047025
PCT Pub. Date: Mar. 15, 2018

(65) Prior Publication Data
US 2019/0190385 A1 Jun. 20, 2019

(30) Foreign Application Priority Data

Sep. 8, 2016 (IT) .................... 102016000090751

(51) Int. Cl.
*H02M 3/156* (2006.01)
*H02M 3/158* (2006.01)
(Continued)

(52) U.S. Cl.
CPC ............ *H02M 3/158* (2013.01); *H02M 1/14* (2013.01); *H02M 3/155* (2013.01); *H02M 3/156* (2013.01); *H02M 3/33553* (2013.01); *H05B 33/0815* (2013.01); *H02M 2001/0006* (2013.01); *H02M 2001/0087* (2013.01)

(58) Field of Classification Search
CPC ...... H02M 3/155; H02M 3/158; H02M 3/156; H02M 3/33553; H02M 1/14; H02M 2001/0006; H02M 2001/0087; H05B 33/0806; H05B 33/0815; H05B 33/0845;
(Continued)

(56) References Cited

U.S. PATENT DOCUMENTS

| 4,779,185 A | 10/1988 | Musil |
| 4,970,451 A | 11/1990 | Suomalainen |
| 7,276,863 B2* | 10/2007 | Lee ..................... G09G 3/342 315/307 |

FOREIGN PATENT DOCUMENTS

EP 0111729 A1 6/1984

* cited by examiner

*Primary Examiner* — Wei (Victor) Y Chan
*Assistant Examiner* — Henry Luong
(74) *Attorney, Agent, or Firm* — Browdy and Neimark, PLLC

(57) ABSTRACT

An electronic converter (1) comprises a pair of input terminals (IN+, IN−) particularly suitable to be connected to a power supply unit (10) with a constant electric current output, and a pair of output terminals (OUT+, OUT−) particularly suitable to be connected to an electrical load (5). The electronic converter (1) further comprises an electric current conversion stage (2) connected to said input terminals (IN+, IN−) and to said output terminals (OUT+, OUT−), and a controller (3) connected to the electric current conversion stage (2) and particularly suitable to control the electrical energy output from the electronic converter (1).

11 Claims, 6 Drawing Sheets

(51) Int. Cl.
*H02M 3/155* (2006.01)
*H02M 1/14* (2006.01)
*H02M 3/335* (2006.01)
*H05B 33/08* (2020.01)
*H02M 1/00* (2006.01)

(58) Field of Classification Search
CPC ............ H05B 33/0848; H05B 33/0866; H05B 33/089
See application file for complete search history.

ELECTRONIC CONVERTER

TECHNICAL FIELD

The present invention refers to the electronic converter devices industry, and it was developed with particular reference to an electric current electronic converter with a direct electric current input. The present invention particularly, but not exclusively, applies to use in the light source trimming devices industry, in particular the LED light sources.

PRIOR ART

The electronic converters of the known type that allow controlling the power absorbed by an electrical load comprise a switching converter connected to the mains voltage and a control module connected in parallel to the switching converter. By acting on the adjustment interface of the switching converter, the control module, also connected to the mains voltage, enables controlling the electrical quantity input to the electrical load, for example, enabling to modulate or adjust the electric current output from the converter to modify the intensity of the light emitted by a light source used as an electrical load.

EP0111729A1 relates to a circuit arrangement for supplying a DC voltage to be maintained constant to electric loads, at least one load being connected via a switching regulator to a supply loop fed with an impressed current. The circuit maintains its regulation even if the loads fluctuate greatly within a short time. The switching regulator the switching element is arranged parallel to the input; that between the switching element and a capacitor lying parallel to the output of the switching regulator a diode is arranged which is cut off when the switching element is conducting. The circuit arrangement can be used to advantage in power supply equipments of electric communications systems.

However, the devices of the known type reveal several drawbacks. Firstly, the control module must comprise protections against mains overvoltage and a power supply filter.

In addition, the control module must meet predetermined and specific safety and galvanic isolation requirements, in that directly connected to the mains voltage. This implies a high number of connections and wiring, as well as a bulky size of the control module in the body of the light source.

In addition, if the control module is to measure the electrical quantities required to calculate energy consumption, the overall cost of the electronic converter rises further.

Still, the circuit configuration of the devices of the known type requires compliance with the safety regulations of the control module and this contributes to making the devices of the known type particularly expensive.

Various experiments carried out by the Applicant revealed that the control module of the devices of the known type introduces further phase shifts in the electric current that feeds the system made up of a power supply unit, a control module and an electrical load. Given that an electric current phase shift reduces the operating efficiency of the mains power supply, there arises the need for an electric current electronic converter that does not introduce a further electric current phase shift thus optimizing the operating efficiency.

One of the main objects of the present invention is to meet such need and overcome the drawbacks of the devices of the known type.

DESCRIPTION OF THE INVENTION

An embodiment of the present invention provides an electronic converter comprising:

a pair of input terminals particularly suitable to be connected to a power supply unit with a constant electric current output, and a pair of output terminals particularly suitable to be connected to an electrical load, an electric current conversion stage connected to said input terminals and to said output terminals, and a controller connected to the electric current conversion stage, and particularly suitable to control the electrical energy output from the electric current conversion stage.

This solution enables obtaining a constant electric current to constant electric current or constant electric current to constant voltage electronic converter, that is dimmable, or in which the output electric current or the output voltage can be controlled.

Another aspect of the present invention provides for that the electric current conversion stage comprises a switching converter circuit.

This solution enables utilizing a power supply unit with a constant electric current output and controlling the electric current, or voltage, output from the electronic converter, and it also enables obtaining a reduction of the output electric current ripple.

A further aspect of the present invention provides for that the electric current conversion stage comprises a stage of power supplying the controller connected to the switching converter circuit.

Thanks to this solution, the operation of the controller is guaranteed even were the electrical load, and thus the conversion stage, to be switched OFF.

Another aspect of the present invention provides for that the power supply stage comprises a constant electric current to constant voltage converter circuit connected in series to the switching converter circuit.

Another aspect of the present invention provides for that the constant electric current to constant voltage converter circuit of the power supply stage comprises a pair of input terminals, a pair of output terminals, a diode, a field-effect transistor connected between the diode and one of the input terminals, an inductor connected to the diode and to one of the output terminals, and a capacitor connected between the inductor and one of the input terminals.

Thanks to this solution, varying the duration of the field-effect transistor switch ON time and controlling such duration, enables obtaining an output direct voltage useful for feeding the controller.

Another aspect of the present invention provides for that the power supply stage may comprise an isolation transformer connected between the field-effect transistor and the diode.

This solution enables enhancing the safety and galvanic isolation aspects of the electronic converter.

Another aspect of the present invention provides for that the electric current conversion stage comprises an input filter connected to the input terminals of the electronic converter, to the switching converter circuit and to the power supply stage of the controller.

Another aspect of the present invention provides for that the switching converter circuit of the electric current conversion stage comprises a pair of input terminals and a pair of output terminals, a diode connected to one of the input terminals and a field-effect transistor, an inductance, a capacitor connected between the inductance and the field-effect transistor, and a measurement resistor connected between one of the output terminals and a node common to the capacitor and the field-effect transistor.

This solution enables measuring the fundamental electrical quantities of the system, such as the output electric current, the output voltage and the output power, and estimating some derivable quantities such as the power input.

A further aspect of the present invention provides for that the switching converter circuit may comprise an isolation transformer connected between the field-effect transistor and the diode.

Another aspect of the present invention provides for that the controller comprises a pair of input terminals, a pair of control terminals, a differential amplifier block, a voltage comparator block, and a control voltage generator block connected to the ends of the pair of control terminals.

This solution enables controlling and varying the electric current output from the electronic converter, for example dimming a LED lighting body.

A further aspect of the present invention provides for that the controller further comprises a block for receiving a control signal This solution enables the remote control of the electric current output from the electronic converter, and/or through a wireless connection, for example by means of a smart phone or a tablet, using a Wi-Fi connection.

Another aspect of the present invention provides for that the switching converter circuit of the electric current conversion stage, may comprise a pair of input terminals and a pair of output terminals, a first field-effect transistor connected to one of the input terminals, a second field-effect transistor, an inductance, a capacitor connected between the inductance and the second field-effect transistor, and a measurement resistor connected between one of the output terminals and a node common to the capacitor and to the second field-effect transistor.

This solution enables disconnecting the electrical load, for example switching off the light source, inducing the power supply unit to operate in off-load mode, or generating a short-circuit condition on the output of the power supply unit.

BRIEF DESCRIPTION OF THE DRAWINGS

Further characteristics and advantages of the present invention will be more apparent from the following description, solely provided by way of example, with reference to the attached figures, wherein.

BEST EMBODIMENT OF THE INVENTION

The idea on which the present invention is based is to provide an electronic converter comprising a stage of converting electric current from constant electric current to constant electric current, or from constant electric current to a constant voltage, said electronic converter being dimmable.

A similar electronic converter, capable of providing a constant electric current output, particularly applies to use in the power supplying of a light source, and even more particularly, a LED light source. Such electronic converter is dual to the more common "buck" converter, where the expression "buck" converter is used to indicate a converter for switching from constant voltage to constant voltage or from constant voltage to constant electric current.

Figure 1:
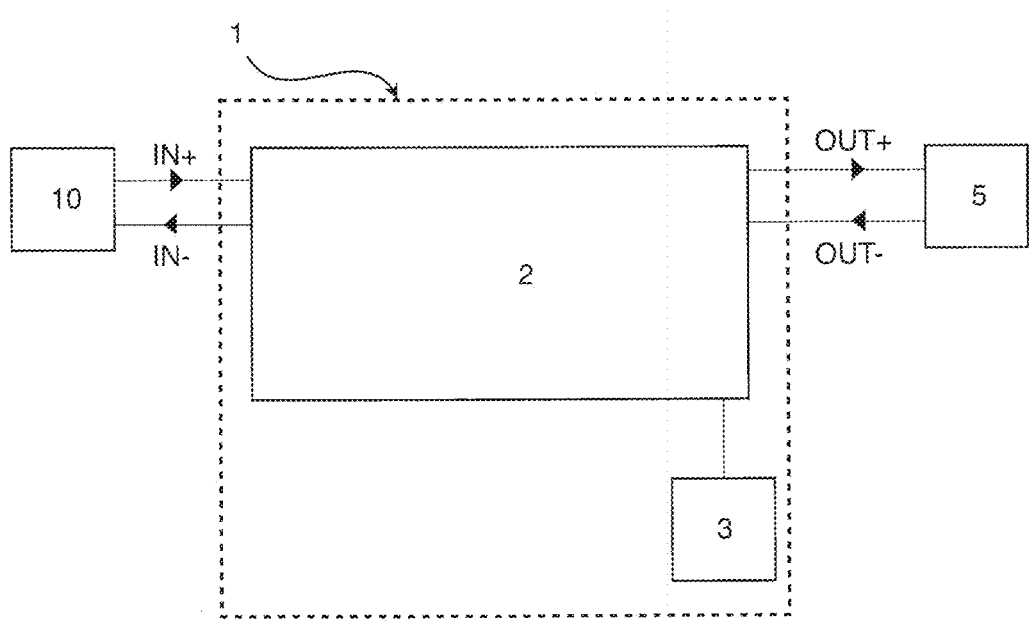
FIG. 1 is a block schematic view of one of the embodiments of the electronic converter according to the present invention.

FIG. 1 shows one of the preferred embodiments of an electronic converter 1 according to the present invention. The electronic converter 1 comprises a pair of input terminals IN+, IN−, particularly suitable to be connected, in use, to a power supply unit 10 with a constant electric current output. The electronic converter 1 comprises a pair of output terminals OUT+, OUT−, particularly suitable to be connected, in use, to an electrical load 5. The electronic converter 1 further comprises an electric current conversion stage 2, connected to said input terminals IN+, IN− and to said output terminals OUT+, OUT−, and a controller 3 connected to the electric current conversion stage 2.

In use, the electric current conversion stage 2 provides—in output—a constant electric current to the electrical load 5, and the controller 3, controls the operation of the electric current conversion stage 2 and, thus, adjust the electric current fed to the electrical load 5.

Figure 2:
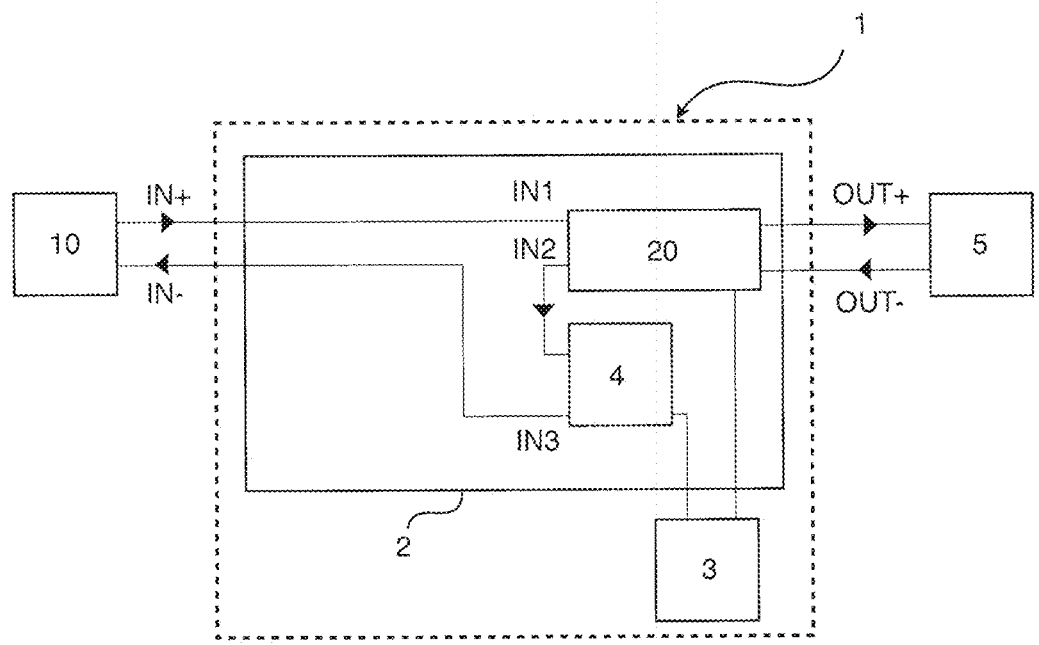
FIG. 2 is a block schematic view of another embodiment of the electronic converter according to the present invention.
Figure 3:
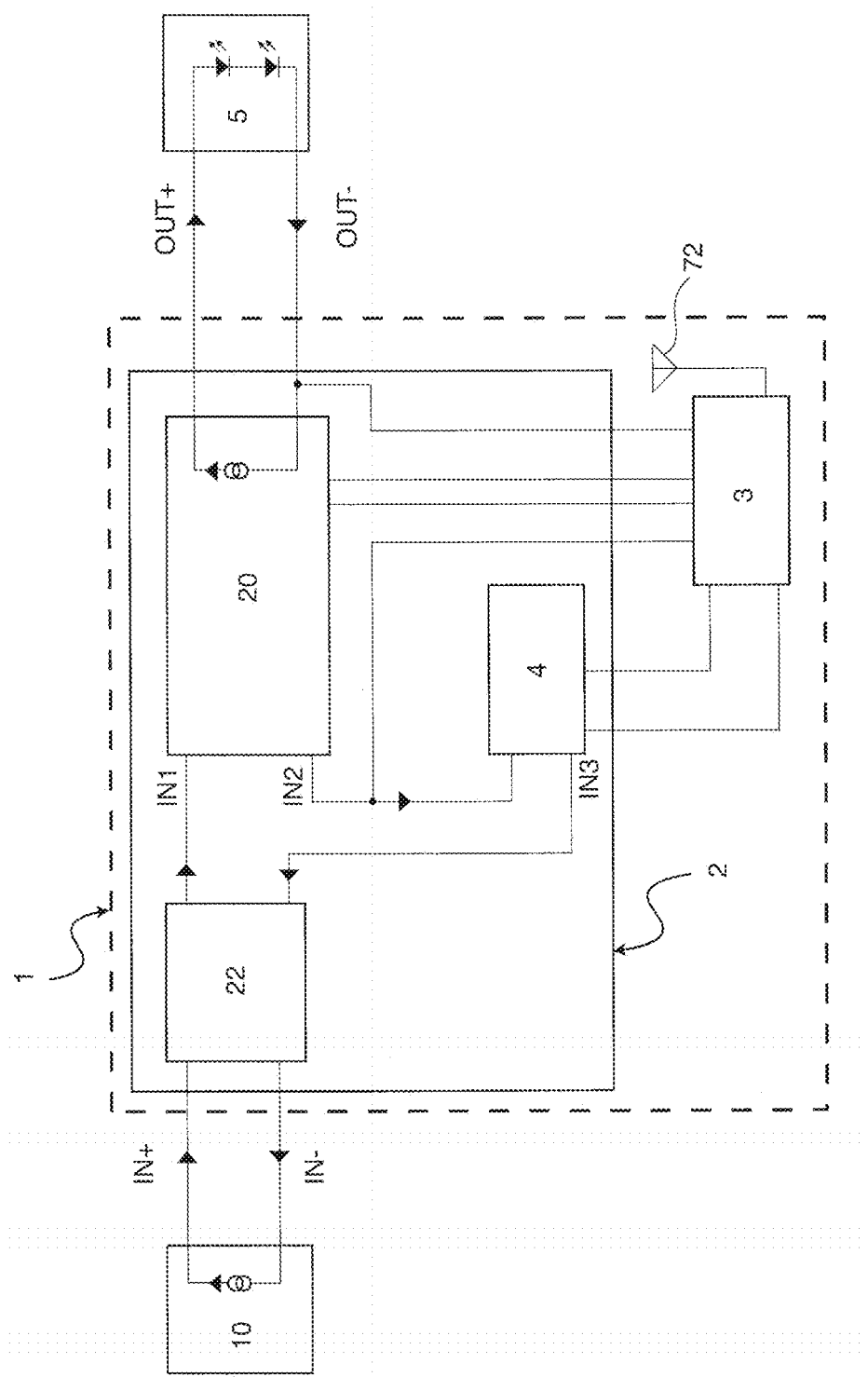
FIG. 3 is a block schematic view of a further embodiment of the electronic converter according to the present invention.

According to another embodiment of the present invention, illustrated in FIG. 2, the electric current conversion stage 2 of the electronic converter 1 may comprise a switching converter circuit 20 and a power supply stage 4 connected to the controller 3, to the switching converter circuit 20 and to one of the inputs IN− of the electronic converter 1.

In use, the electric current output from the power supply unit 10 passes through the port constituted by the input terminals IN1 and IN2 of the switching converter 20 and enters into the input port constituted by the terminals IN2 and IN3 of the power supply stage 4. Such electric current enables the operation of the power supply stage 4 which, in turn, will be capable of generating the power supply for the controller 3.

According to a further embodiment of the present invention, the electric current conversion stage 2 of the electronic converter 1 may comprise an input filter 22 connected to the switching converter circuit 20 and to the power supply stage 4 of the controller 3.

The input filter 22 is particularly suitable, in use, to be connected in series to the output of a power supply unit 10 with a constant electric current output, for example, but not limitedly, a control gear, or a power supply unit for LED light sources.

In use, the input filter 22 enables eliminating the high frequency absorptions present at the input port of the electronic converter 1 comprising the terminals IN+ and IN−.

Figure 4:
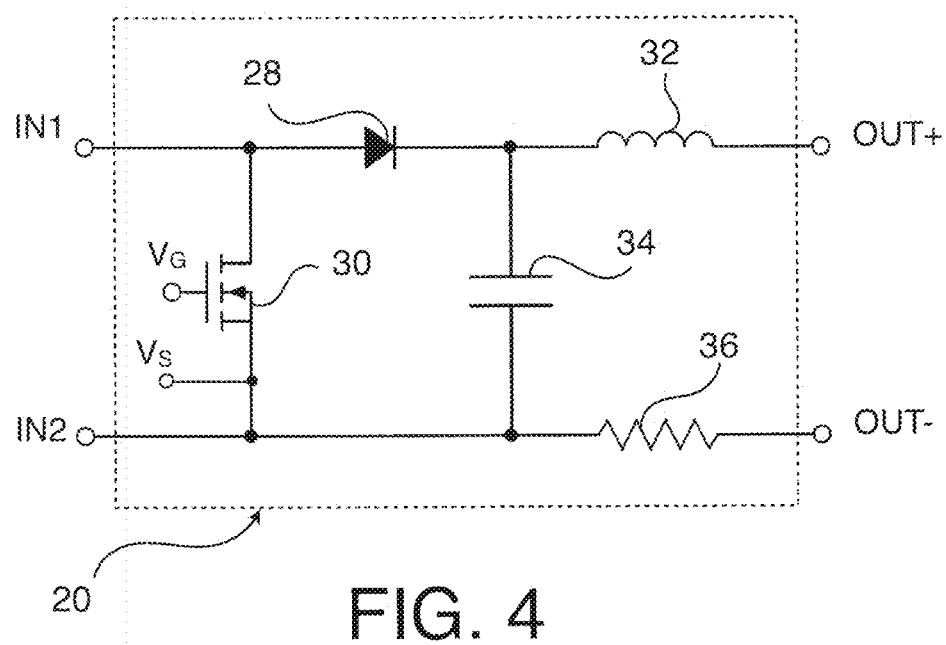
FIG. 4 is a circuit diagram of a switching converter circuit according to the present invention.

The switching converter circuit 20 of the electric current conversion stage 2, in the embodiment illustrated in FIG. 4, includes a pair of input terminals IN1, IN2 respectively connected to an output terminal of the input filter 22 and to a terminal of the power supply stage, and a pair of output terminals OUT+, OUT− particularly suitable, in use, to be connected to an electrical load, preferably a light source, even more preferably to a LED light source.

The switching converter circuit 20 further comprises a pair of control terminals $V_G$, $V_S$ particularly suitable to receive a control signal coming from the controller 3.

The switching converter circuit 20 comprises a diode 28 connected both to one of the input terminals IN1 and to the field-effect transistor 30, preferably a MOSFET, even more preferably an n-channel MOSFET.

The switching converter 20 further comprises an inductance 32, and another capacitor 34 connected between the inductance 32 and one of the input terminals IN2 to which the MOSFET 30 is also connected. Lastly, the switching converter comprises a measurement resistor 36 connected between one of the output terminals OUT− of the switching converter and the node common to the capacitor 34 and the MOSFET 30, particularly suitable—in use—for measuring an electric current $I_{LED}$, or an electric current output from the switching converter circuit 20 of the power stage 2.

Figure 5:
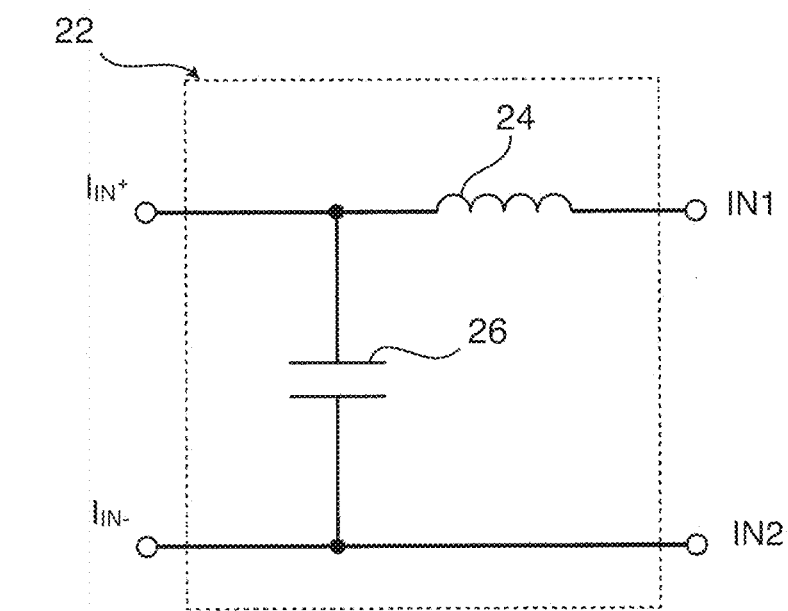
FIG. 5 is a circuit diagram of an input filter according to the present invention.

The input filter 22, in the embodiment illustrated in FIG. 5, comprises a pair of input terminals IN+, IN− particularly suitable, in use, to be connected to the control gear 10. The input filter 22 includes an inductance 24 connected to the input terminal IN+ and a capacitor 26 connected between the inductance 24 and the input terminal IN−.

Figure 6:
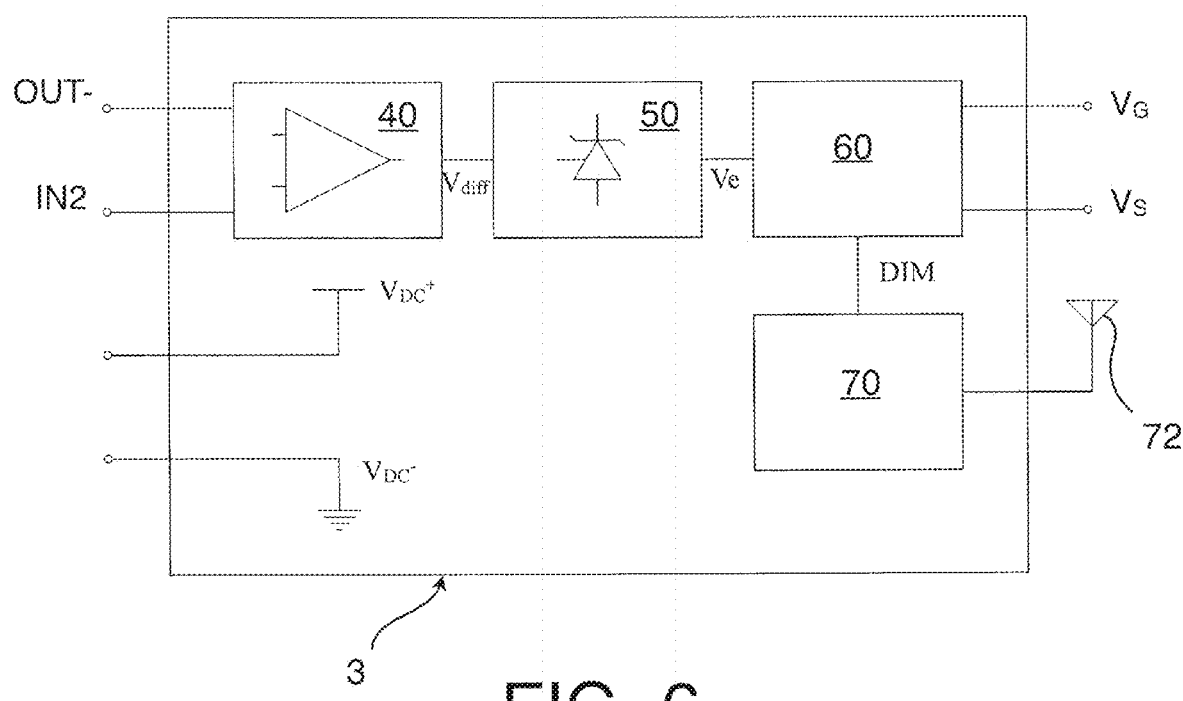
FIG. 6 is a circuit diagram of a controller according to the present invention.

With particular reference to FIG. 6, the controller 3 comprises a pair of input terminals OUT−, IN2 for measuring the voltage at the ends of the measurement resistor 36 of the switching converter 20 of the electric current conversion stage 2, and a pair of control terminals $V_G$ and $V_S$.

The controller 3 further comprises a differential amplifier block 40 particularly suitable, in use, for the differential amplification of the voltage that falls on the ends of the terminals OUT− and IN2, and a voltage comparator block 50 for a voltage Vdiff, output from the differential amplifier block 40, with a reference voltage and generating an error voltage Ve.

The controller 3 further comprises a control voltage generator block 60 at the ends of the control terminals $V_G$ and $V_S$; such control voltage will have formed a rectangular wave with a duty cycle proportional to the value of an error voltage Ve.

The controller 3 further comprises a receiving block 70 for receiving a control signal comprising a communication interface via radio and/or by cable, by way of non-limiting example, an antenna 72, and particularly suitable, in use, to manage the operation of the control voltage generator block 60 through a DIM signal.

According to a particularly advantageous characteristic of the present invention, the controller 3 is capable of managing the electric current conversion, or adjusting the duration of the MOSFET 30 switching ON time, so as to obtain a splitting of the electric current $I_{LED}$ output from the block 20.

The power supply stage 4 of the controller 3 includes a constant electric current to constant voltage converter circuit, particularly suitable to be connected, in use, in series to the output of the control gear 10.

Figure 7:
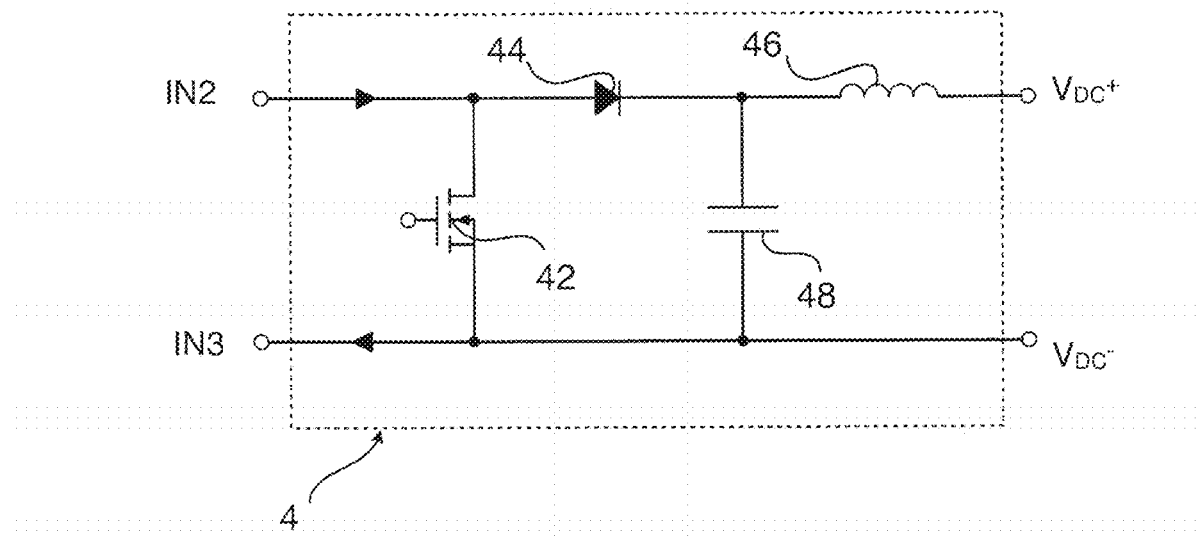
FIG. 7 is a circuit diagram of a power supply stage according to the present invention.

With reference to the embodiment illustrated in FIG. 7, the power supply stage 4 comprises a pair of input terminals IN2 and IN3 and a pair of output terminals VDC+ and VDC−, a diode 44 and a MOSFET 42 connected between the diode 44 and the input terminal IN3.

The power supply stage 4 further comprises an inductor 46 connected to the diode 44 and to one of the output terminals (VDC+), and a capacitor 48 connected between the inductor 46 and one of the input terminals (IN3).

Thanks to this configuration, in use, varying the duration of the MOSFET 42 switching ON time and controlling such duration enables obtaining a direct voltage $V_{DC}$ between the output terminals VDC+ and VDC− useful for feeding the controller 3.

Figure 8:
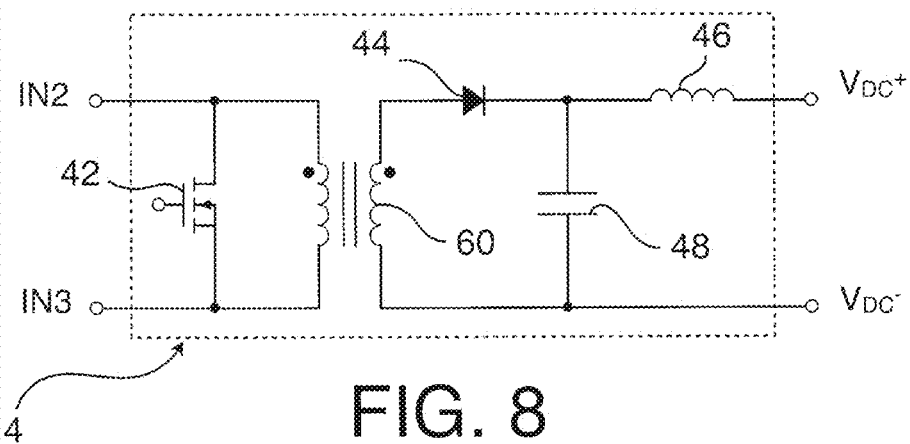
FIG. 8 is a circuit diagram of one of the embodiments of the power supply stage of FIG. 5.

According to another among the embodiments of the present invention illustrated in FIG. 8, the power supply stage 4 of the controller 3 may comprise a constant electric current to constant voltage isolated converter circuit. The isolated power supply stage comprises an isolation transformer 60 connected between the MOSFET 42 and the diode 44.

Figure 9:
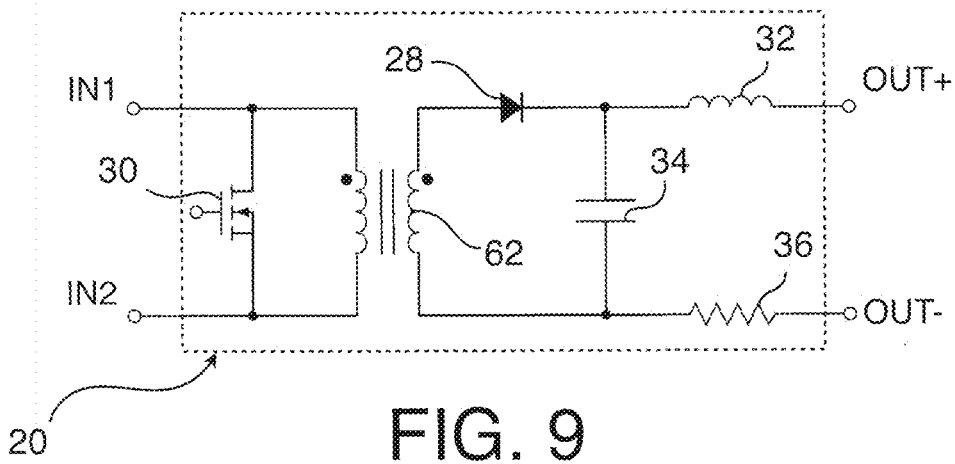
FIG. 9 is a circuit diagram of one of the embodiments of the switching converter circuit of FIG. 4.

According to another among the embodiments of the present invention illustrated in FIG. 9, the switching converter circuit 20 may comprise a direct electric current to direct electric current, or direct voltage, isolated switching converter circuit. In both cases, the isolated switching converter circuits comprise an isolation transformer 62 connected between the MOSFET 30 and the diode 28.

Figure 10:
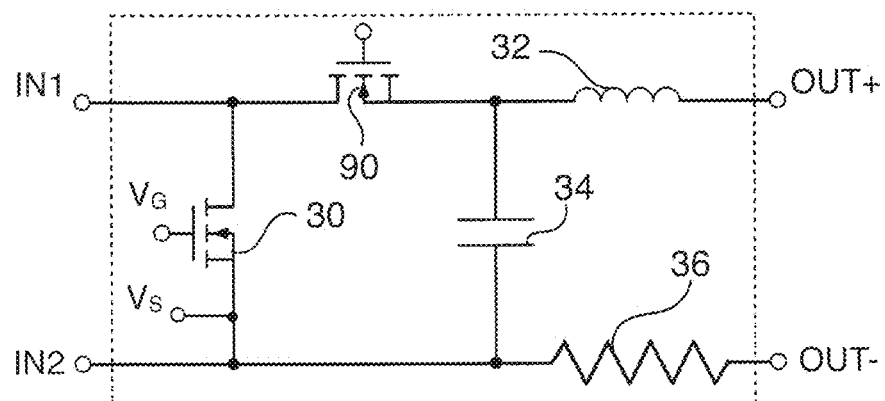
FIG. 10 is a circuit diagram of the switching converter circuit of FIG. 4 in a synchronous fashion.
Figure 11A:
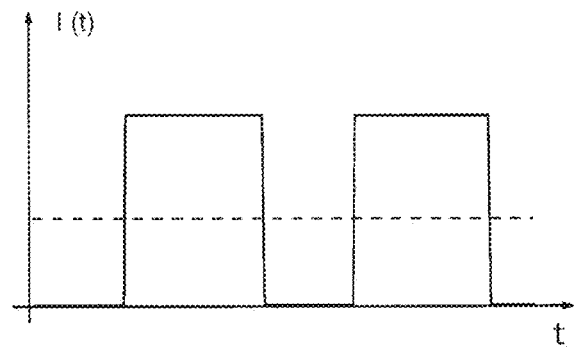
FIGS. 11a to 11d are schematic diagrams of the trend of the electric currents and voltages regarding the main components of the switching converter circuit of FIG. 2 over time.
Figure 11B:
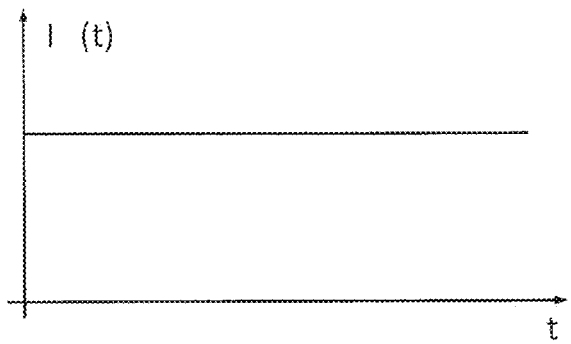
Figure 11C:
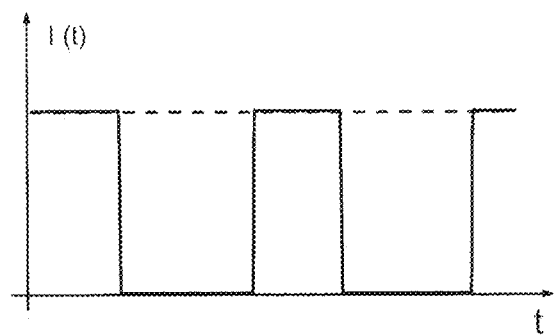
Figure 11D:
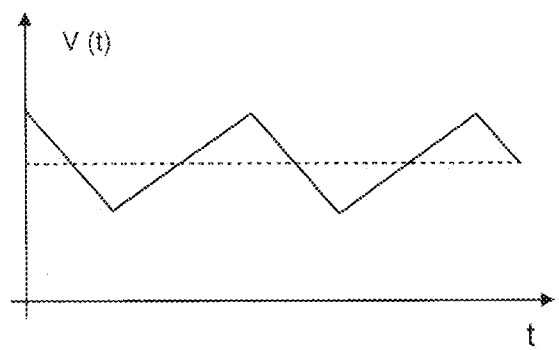

According to another among the preferred embodiments of the present invention, the switching converter circuit 20 subject of the present invention may provide for a synchronous configuration. In this configuration, illustrated in FIG. 10, the switching converter circuit 20 of the electric current conversion stage 2, comprises a further field-effect transistor, preferably a MOSFET 90 instead of the diode 28 of the switching converter circuit 20 illustrated in FIG. 2.

This configuration, in use, enables disconnecting the electrical load, or the light source, and inducing the control gear 10 to operate in off-load mode. Alternatively, a short circuit condition can also be generated on the output of the control gear 10. Both of these operating conditions of the control gear 10 may be used for switching the LED light source OFF.

In use, the present invention enables obtaining a dimmable electronic converter 1 to be interposed between a direct electric current power supply unit and an electrical load, preferably between a LED control gear and a LED light source altering the efficiency of the entire system the least possible.

With particular reference to FIGS. 11a to 11d, there should be observed the importance of the relationship between the mean values of the electric currents $I_{LED}$ and $I_{IN}$, where $I_{LED}=(1-D) \times I_{IN}$ and where D=Ton/(Ton+Toff), and in particular where Ton is the duration of the switching ON phase of the MOSFET 30 of the switching converter circuit 20 and Toff is the duration of the switching OFF phase of the MOSFET 30 of the switching converter circuit 20.

The efficiency of the system is imperceptibly altered, in particular if the constant electric current to constant electric current switching converter is configured in a synchronous manner, or if a MOSFET 90 is used instead of the diode 28 as described previously, and in particular if it is used with D=0, or in the condition of $I_{LED}=I_{IN}$. In this case, the efficiency in the electric current conversion of the dimmable electronic converter 1 of the present invention will be close to one unit.

As regards dimming, adjusting the duration of the switching ON phase of the mosfet 30 of the switching converter circuit 20, enables varying the electric current output from the electronic converter 1 of the invention according to the relation $I_{LED}=(1-D) \times I_{IN}$.

As regards the techniques for controlling the electric current $I_{LED}$, or the electric current output from the switching converter circuit 20 of the electric current converter stage 2, there can be used the most common techniques already used in the switching of the type with a constant electric current output, or a reading of the electric current $I_{LED}$, may be carried out by reading the voltage at the ends of the resistor 36 suitably amplified (Vdiff), which can be used as controlled quantity in a system where the control quantity is the duration of the switching ON phase of the Mosfet 30 of the switching converter circuit 20, or Ton, and the error voltage Ve is the result of the comparison of the voltage Vdiff with a reference voltage.

As previously indicated, the electronic converter 1 may be used as a direct electric current to direct voltage non-isolated converter using the circuits described up to now but varying the control method, or using the output voltage between the terminals OUT+ and OUT− ($V_{LED}$) of the switching conversion circuit 20 as the controlled quantity, instead of the output electric current $I_{LED}$.

All combinations and duals of the commonly known switching topologies fall within the scope of the present invention, in particular all topologies, isolated and non-isolated, that enable obtaining a constant electric current to constant electric current or constant electric current to electric current voltage conversion.

All details can be replaced by other technically equivalent elements. Likewise, the materials used as well as the shapes and contingent dimensions, may vary according to the needs without departing from the scope of protection of the claims that follow.

The invention claimed is:

1. An electronic converter comprising:
    a pair of input terminals particularly suitable to be connected to a power supply unit with a constant electric current output, and
    a pair of output terminals particularly suitable to be connected to an electrical load (5),
    an electric current conversion stage connected to said input terminals and to said output terminals, the electric current conversion stage comprising a switching converter circuit, and
    a controller connected to the electric current conversion stage and particularly suitable to control the electrical energy output from the converter, wherein the switching converter circuit comprises a measurement resistor connected to an output terminal, and
    wherein the controller comprises:
    a pair of input terminals connected to a differential amplifier block for measuring a voltage at the ends of the measurement resistor proportional to an electric current output from the switching converter circuit,
    a pair of control terminals,
    a control voltage generator block connected to the switching converter circuit through the pair of control terminals, and arranged for providing thereto a control voltage, based on said measured voltage, controlling the electric current output, and
    a receiving block comprising a communication interface for receiving a control signal via at least one between radiofrequency and a cable, and arranged for providing a signal to the control voltage generator block for managing the operation thereof in order to remotely controlling the electric current output from the electronic converter.

2. The electronic converter according to claim 1, wherein the electric current conversion stage comprises a power supply stage of the controller connected to the switching converter circuit.

3. The electronic converter according to claim 2, wherein the power supply stage comprises a constant electric current to constant voltage converter circuit connected to the switching converter circuit in series.

4. The electronic converter according to claim 3, wherein the constant electric current to constant voltage converter circuit of the power supply stage comprises a pair of input terminals, a pair of output terminals, a diode, a field-effect transistor connected to the diode and one of the input terminals, an inductor connected to the diode and to one of the output terminals, and a capacitor connected between the inductor and one of the input terminals.

5. The electronic converter according to claim 4, wherein the power supply stage comprises an isolation transformer connected between the field-effect transistor and the diode.

6. The electronic converter according to claim 1, wherein the electric current conversion stage further comprises an input filter connected to the input terminals of the electronic converter, to the switching converter circuit and to the power supply stage of the controller.

7. The electronic converter according to claim 1, wherein the switching converter circuit of the electric current conversion stage comprises a pair of input terminals and a pair of output terminals, a diode connected to one of the input terminals and a field-effect transistor, an inductance, a capacitor connected between the inductance and the field-effect transistor, and wherein the measurement resistor is connected between one of the output terminals and a node common to the capacitor and the field-effect transistor.

8. The electronic converter according to claim 7, wherein the switching converter circuit comprises an isolation transformer connected between the field-effect transistor and the diode.

9. The electronic converter according to claim 1, wherein the controller further comprises the differential amplifier block for the differential amplification of the measured voltage and outputting a differential voltage, and a voltage comparator block for comparing the differential voltage with a reference voltage and generating an error voltage, the control voltage generator block forming a rectangular wave with a duty cycle proportional to the value of the error voltage.

10. Electronic converter according to claim 1, wherein the switching converter circuit of the electric current conversion stage comprises a pair of input terminals and a pair of output terminals, a first field-effect transistor connected to one of the input terminals a second field-effect transistor, an inductance, a capacitor connected between the inductance and the second field-effect transistor, and wherein the measurement resistor is connected between one of the output terminals and a node common to the capacitor and to the second field-effect transistor.

11. An LED light source comprising at least a LED a body and the electronic converter according to claim 1, wherein said electronic converter is housed in said body.

* * * * *